US012120559B2

(12) United States Patent
Zheng et al.

(10) Patent No.: US 12,120,559 B2
(45) Date of Patent: Oct. 15, 2024

(54) SSB MEASUREMENT METHOD AND APPARATUS

(71) Applicant: HUAWEI TECHNOLOGIES CO., LTD., Guangdong (CN)

(72) Inventors: Lili Zheng, Shanghai (CN); Hongping Zhang, Shenzhen (CN); Qinghai Zeng, Shanghai (CN); Jia Liu, Shanghai (CN); Jingxin Wei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 350 days.

(21) Appl. No.: 17/670,237

(22) Filed: Feb. 11, 2022

(65) Prior Publication Data

US 2022/0167222 A1 May 26, 2022

Related U.S. Application Data

(63) Continuation of application No. PCT/CN2020/099992, filed on Jul. 2, 2020.

(30) Foreign Application Priority Data

Aug. 15, 2019 (CN) .......................... 201910755097.X

(51) Int. Cl.
H04W 36/00 (2009.01)
H04W 56/00 (2009.01)
(Continued)

(52) U.S. Cl.
CPC ..... *H04W 36/0058* (2018.08); *H04W 56/001* (2013.01); *H04W 72/20* (2023.01); *H04W 72/23* (2023.01)

(58) Field of Classification Search
CPC ..... H04L 5/001; H04L 5/0048; H04L 5/0094; H04W 36/0058; H04W 36/0088; H04W 48/12; H04W 56/001; H04W 72/20
See application file for complete search history.

(56) References Cited

U.S. PATENT DOCUMENTS

2019/0363809 A1* 11/2019 Yoon .................... H04W 56/001
2020/0229017 A1* 7/2020 Liu ........................ H04L 5/0048
(Continued)

FOREIGN PATENT DOCUMENTS

CN 105868037 A 8/2016
CN 109474939 A 3/2019
(Continued)

OTHER PUBLICATIONS

Bergqvist et al., "Beam Information in Early Measurements", Telefonaktiebolaget LM Ericsson (Publ), U.S. Appl. No. 62/805,602 20190214, Total pp. 71 (Year: 2019).*
(Continued)

*Primary Examiner* — Shah M Rahman
(74) *Attorney, Agent, or Firm* — Fish & Richardson P.C.

(57) ABSTRACT

Embodiments of this application provide a synchronization signal/physical broadcast channel block (SSB) measurement method and an apparatus. One example method includes that a terminal device receives first information and second information. The first information indicates a time domain position of an SSB sent by a serving cell, and the second information indicates a set of SSBs that the terminal device needs to measure and that are sent by a neighboring cell. The terminal device measures, in a first measurement window based on the first information, the SSB sent by the serving cell. The terminal device measures, in a second measurement window based on the second information, the SSB sent by the neighboring cell.

12 Claims, 5 Drawing Sheets

(51) Int. Cl.
*H04W 72/20* (2023.01)
*H04W 72/23* (2023.01)

(56) References Cited

U.S. PATENT DOCUMENTS

| | | | | |
|---|---|---|---|---|
| 2020/0280940 A1* | 9/2020 | Kim | ...................... | H04W 76/28 |
| 2020/0358547 A1* | 11/2020 | Liu | ...................... | H04J 11/0069 |
| 2020/0374735 A1* | 11/2020 | Wei | ...................... | H04L 5/0091 |
| 2020/0403743 A1* | 12/2020 | Bergqvist | .............. | H04W 72/21 |
| 2021/0029572 A1* | 1/2021 | Harada | ............... | H04W 56/001 |
| 2021/0083730 A1* | 3/2021 | Hwang | ................. | H04L 5/0092 |
| 2021/0099264 A1* | 4/2021 | Liu | ...................... | H04W 72/23 |
| 2021/0219251 A1* | 7/2021 | Tang | ................... | H04W 56/001 |
| 2021/0329507 A1* | 10/2021 | Yao | ................... | H04W 36/0085 |
| 2021/0352588 A1* | 11/2021 | Liu | ................... | H04W 52/0235 |
| 2021/0392595 A1* | 12/2021 | Wang | ................... | H04W 24/10 |
| 2022/0022072 A1* | 1/2022 | Jiang | ................... | H04W 24/10 |
| 2022/0182859 A1* | 6/2022 | Da Silva | ........... | H04W 52/0274 |
| 2022/0312354 A1* | 9/2022 | Teyeb | ................. | H04W 56/002 |
| 2022/0377838 A1* | 11/2022 | Kim | ...................... | H04W 76/20 |

FOREIGN PATENT DOCUMENTS

| | | |
|---|---|---|
| CN | 109600770 A | 4/2019 |
| EP | 3480978 A1 | 5/2019 |
| WO | 2019047192 A1 | 3/2019 |

OTHER PUBLICATIONS

3GPP TS 38.133 V16.0.0 (Jun. 2019), "3rd Generation Partnership Project; Technical Specification Group Radio Access Network;NR; Requirements for support of radio resource management(Release 16)," Jun. 2019, 1002 pages.

3GPP TS 38.213 V15.6.0 (Jun. 2019), "3rd Generation Partnership Project; Technical Specification Group Radio Access Network;NR;Physical layer procedures for control(Release 15)," Jun. 2019, 107 pages.

3GPP TS 38.300 V15.6.0 (Jun. 2019), "3rd Generation Partnership Project; Technical Specification Group Radio Access Network; NR; NR and NG-RAN Overall Description; Stage 2(Release 15)," Jun. 2019, 99 pages.

3GPP TS 36.331 V15.6.0 (Jun. 2019), "3rd Generation Partnership Project; Technical Specification Group Radio Access Network; Evolved Universal Terrestrial Radio Access (E-UTRA); Radio Resource Control (RRC); Protocol specification (Release 15)," Jun. 2019, 960 pages.

3GPP TS 38.331 V15.6.0 (Jun. 2019), "3rd Generation Partnership Project; Technical Specification Group Radio Access Network; NR; Radio Resource Control (RRC) protocol specification(Release 15)," Jun. 2019, 519 pages.

Huawei, HiSilicon, "Discussion on LS on collision of RRM measurement resources with uplink transmissions in FR1 TDD," 3GPP TSG-RAN WG4 Meeting #90bis, R4-1903812, Xi'an, China, Apr. 8-12, 2019, 6 pages.

Huawei, HiSilicon, "Discussion on the ASN.1 for the reference signals, " 3GPP TSG-RAN WG2 Meeting 102, R2-1807963, Busan, Korea, May 21-25, 2018, 4 pages.

Office Action issued in Chinese Application No. 201910755097.X on Jun. 8, 2021, 12 pages (with English translation).

PCT International Search Report and Written Opinion issued in International Application No. PCT/CN2020/099992 on Sep. 23, 2020, 15 pages (with English translation).

Ericsson (email rapporteur), "Email report 105_56—RRM Related Aspects for Power Saving," 3GPP TSG-RAN2 Meeting #105bis, R2-1904155, Xi'an, China, Apr. 8-12, 2019, 24 pages.

Extended European Search Report issued in European Application No. 20853211.9 on Sep. 1, 2022, 10 pages.

LG Electronics, "Discussion on Measurement Applicability in Mixed Numerology in NR," 3GPP TSG-RAN WG4 Meeting #84bis, R4-1710612, Dubrovnik, Croatia, Oct. 9-13, 2017, 4 pages.

\* cited by examiner

First bitmap

Second bitmap

SSB MEASUREMENT METHOD AND APPARATUS

CROSS-REFERENCE TO RELATED APPLICATIONS

This application is a continuation of International Application No. PCT/CN2020/099992, filed on Jul. 2, 2020, which claims priority to Chinese Patent Application No. 201910755097.X, filed on Aug. 15, 2019. The disclosures of the aforementioned applications are hereby incorporated by reference in their entireties.

TECHNICAL FIELD

This application relates to the communication field, and in particular, to a synchronization signal/physical broadcast channel block ((synchronization signal, SS)/(physical broadcast channel, PBCH) block, SSB) measurement method and an apparatus.

BACKGROUND

Mobility management is an important part in wireless mobile communication. Based on a status of a terminal device, the mobility management may be divided into two parts: mobility management in an idle state (RRC_IDLE state)/inactive state (RRC_INACTIVE state) and mobility management in a connected state (RRC_CONNECTED state). When the terminal device is in an idle state/inactive state, the mobility management includes a cell selection/reselection process. When the terminal device is in a connected state, the mobility management includes a cell handover process. Cell selection/reselection and cell handover each are performed based on a result of mobility measurement. Therefore, mobility measurement is a basis of the mobility management.

Mobility measurement in a new radio (NR) system involves two types of reference signals: an SSB and a channel state information-reference signal (CSI-RS). For SSB-based measurement, a network device may indicate, by using a bitmap, a set of SSBs that the terminal device needs to measure. For example, the bitmap may be ssb-ToMeasure, and ssb-ToMeasure indicates a set of SSBs that the terminal device needs to measure on a frequency. The terminal device measures the set of SSBs of cells on the frequency based on ssb-ToMeasure.

There may be a plurality of cells (the plurality of cells may include a serving cell and a neighboring cell of the serving cell) on the frequency, and positions of SSBs sent by the cells may be different. Therefore, ssb-ToMeasure cannot well reflect a sending status of SSBs of all cells on the frequency. Consequently, the terminal device may miss measuring some SSBs sent by the serving cell, and a measurement result of the serving cell deteriorates.

SUMMARY

Embodiments of this application provide an SSB measurement method and an apparatus, to ensure that a terminal device measures an SSB of a serving cell by using more accurate sending information of the SSB of the serving cell, and improve measurement accuracy on the serving cell.

According to a first aspect, an embodiment of this application provides a measurement method, including: A terminal device receives first information, where the first information indicates a time domain position of an SSB sent by a serving cell. The terminal device receives second information, where the second information indicates a set of SSBs that the terminal device needs to measure and that are sent by a neighboring cell. The terminal device measures, in a first measurement window based on the first information, the SSB sent by the serving cell. The terminal device measures, in a second measurement window based on the second information, the SSB sent by the neighboring cell.

According to the method in this embodiment of this application, the terminal device may measure, in the first measurement window based on the first information, the SSB sent by the serving cell, where the first information indicates the time domain position of the SSB sent by the serving cell. This can ensure that the terminal device measures the SSB of the serving cell by using more accurate sending information (the first information) of the SSB of the serving cell, and improve measurement accuracy on the serving cell.

According to a second aspect, an embodiment of this application provides a measurement method, including: A terminal device receives first information, where the first information indicates a time domain position of an SSB sent by a serving cell. The terminal device receives second information, where the second information indicates a set of SSBs that the terminal device needs to measure. The terminal device measures, in a first measurement window based on the first information and the second information, the SSB sent by the serving cell. The terminal device measures, in a second measurement window based on the second information, an SSB sent by a neighboring cell.

The SSB sent by the serving cell is measured based on an intersection of the first information and the second information. Compared with that the SSB sent by the serving cell is measured based on only the second information (for example, ssb-ToMeasure), this may avoid redundant measurement that the terminal device needs to perform on the serving cell because a quantity of SSBs indicated by the second information is greater than that of SSBs (that is, SSBs actually sent by the serving cell) indicated by the first information. Therefore, power consumption of the terminal device can be reduced.

In a possible implementation of the first aspect or the second aspect, if the terminal device receives no first information, the terminal device measures, in the first measurement window based on the second information, the SSB sent by the serving cell.

In this way, if the terminal device receives no indication information (the first information) used to indicate the SSB sent by the serving cell, the terminal device may measure, in the first measurement window based on the second information, the SSB sent by the serving cell, and does not need to measure all SSBs sent by the serving cell. Therefore, power consumption of the terminal device can be reduced.

In a possible implementation of the second aspect, the first information includes a first bitmap, and the second information includes a second bitmap. That the terminal device measures, in a first measurement window based on the first information and the second information, the SSB sent by the serving cell includes: If a value of an $N^{th}$ bit in the first bitmap and a value of an $N^{th}$ bit in the second bitmap both are 1, the terminal device measures an SSB indicated by an SSB index corresponding to the $N^{th}$ bits. N is an integer greater than or equal to 0. This may avoid redundant measurement that the terminal device needs to perform on the serving cell because a quantity of SSBs indicated by the second information is greater than that of SSBs (that is, SSBs actually sent by the serving cell) indicated by the first information. Therefore, power consumption of the terminal device can be reduced.

In a possible implementation of the first aspect or the second aspect, the first information or the second information is carried in radio resource control (RRC) signaling or a broadcast message. For example, the first information may be carried in a servingCellConfigCommon field in the RRC signaling, or may be carried in a servingCellConfigCommonSIB field in a system information block (SIB) 1. For example, the second information may be carried in a SIB 2 and/or a SIB 4, or may be carried in a measurement object (MO) in the RRC signaling.

In a possible implementation of the first aspect or the second aspect, the first measurement window and the second measurement window are the same or different. For inter-frequency measurement in a connected state, the network device may configure different measurement windows on different frequencies for the terminal device. For intra-frequency measurement in the connected state, the network device may configure at most two measurement windows on one frequency for the terminal device. The terminal device may measure, in one of the measurement windows, SSBs sent by the serving cell and some neighboring cells; and measure, in the other measurement window, an SSB sent by a remaining neighboring cell.

According to a third aspect, an embodiment of this application provides a terminal device, including: a receiving unit, configured to receive first information, where the first information indicates a time domain position of an SSB sent by a serving cell; where the receiving unit is further configured to receive second information, where the second information indicates a set of SSBs that the terminal device needs to measure and that are sent by a neighboring cell; and a measurement unit, configured to measure, in a first measurement window based on the first information, the SSB sent by the serving cell; where the measurement unit is further configured to measure, in a second measurement window based on the second information, the SSB sent by the neighboring cell.

According to a fourth aspect, an embodiment of this application provides a terminal device, including: a receiving unit, configured to receive first information, where the first information indicates a time domain position of an SSB sent by a serving cell; where the receiving unit is further configured to receive second information, where the second information indicates a set of SSBs that the terminal device needs to measure; and a measurement unit, configured to measure, in a first measurement window based on the first information and the second information, the SSB sent by the serving cell; where the measurement unit is further configured to measure, in a second measurement window based on the second information, an SSB sent by a neighboring cell.

In a possible implementation of the third aspect or the fourth aspect, the measurement unit is configured to: if the receiving unit receives no first information, measure, in the first measurement window based on the second information, the SSB sent by the serving cell.

In a possible implementation of the fourth aspect, the first information includes a first bitmap, and the second information includes a second bitmap. The measurement unit is configured to: if a value of an $N^{th}$ bit in the first bitmap and a value of an $N^{th}$ bit in the second bitmap both are 1, measure an SSB indicated by an SSB index corresponding to the $N^{th}$ bits. N is an integer greater than or equal to 0.

In a possible implementation of the third aspect or the fourth aspect, the first information or the second information is carried in radio resource control RRC signaling or a broadcast message.

In a possible implementation of the third aspect or the fourth aspect, the first measurement window and the second measurement window are the same or different.

According to a fifth aspect, an embodiment of the present invention provides an apparatus. The apparatus exists in a product form of a chip. A structure of the apparatus includes a processor and a memory. The memory is configured to couple to the processor, and stores program instructions and data that are necessary for the apparatus. The processor is configured to execute the program instructions stored in the memory, so that the apparatus performs functions of the terminal device in the foregoing method.

According to a sixth aspect, an embodiment of the present invention provides a terminal device. The terminal device can perform functions performed by the terminal device in the foregoing method embodiments. The functions may be implemented by hardware, or may be implemented by hardware by executing corresponding software. The hardware or software includes one or more modules corresponding to the foregoing functions.

In a possible design, a structure of the terminal device includes a processor and a communication interface. The processor is configured to support the terminal device in performing corresponding functions in the foregoing method. The communication interface is configured to support communication between the terminal device and another network element. The terminal device may further include a memory. The memory is configured to couple to the processor, and stores program instructions and data that are necessary for the terminal device.

According to a seventh aspect, an embodiment of the present invention provides a computer program product including instructions. When the computer program product runs on a computer, the computer is enabled to perform any method provided in the first aspect or the second aspect.

According to an eighth aspect, an embodiment of the present invention provides a computer-readable storage medium including instructions. When the instructions are run on a computer, the computer is enabled to perform any method provided in the first aspect or the second aspect.

An embodiment of the present invention further provides a network device, configured to implement the foregoing SSB measurement method.

An embodiment of the present invention further provides a communication system, including the foregoing network device and the foregoing terminal device.

DESCRIPTION OF EMBODIMENTS

An SSB measurement method and an apparatus are provided in embodiments of this application, and may be applied to a fourth generation ($4^{th}$ generation, 4G) mobile communication system, a fifth generation ($5^{th}$ generation, 5G) mobile communication system, or a future mobile communication system. For example, the SSB measurement method and the apparatus may be applied to a 5G NR system.

Figure 1:
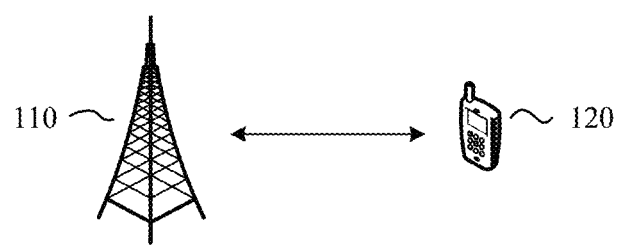
FIG. 1 is a schematic diagram of a communication system 100 according to an embodiment of this application.

For ease of understanding the embodiments of this application, communication systems to which the embodiments of this application are applicable are described in detail with reference to FIG. 1 and FIG. 2. FIG. 1 is a schematic diagram of a communication system 100 to which an embodiment of this application is applicable. As shown in FIG. 1, the communication system 100 may include at least one network device, for example, a network device 110 shown in FIG. 1. The communication system 100 may further include at least one terminal device, for example, a terminal device 120 shown in FIG. 1. The network device 110 may communicate with the terminal device 120 through a radio link.

Figure 2:
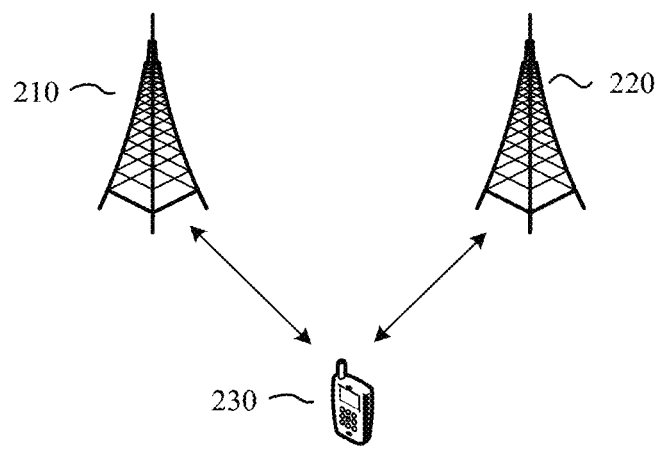
FIG. 2 is a schematic diagram of a communication system 200 according to an embodiment of this application.

FIG. 2 is a schematic diagram of a communication system 200 to which an embodiment of this application is applicable. As shown in FIG. 2, the communication system 200 may include at least two network devices, for example, network devices 210 and 220 shown in FIG. 2. The communication system 200 may further include at least one terminal device, for example, a terminal device 230 shown in FIG. 2. The terminal device 230 may establish a radio link to the network device 210 and the network device 220 by using a dual connectivity (DC) technology or a multi-connectivity technology. The network device 210 may be, for example, a master base station, and the network device 220 may be, for example, a secondary base station. In this case, the network device 210 is a network device that exists during initial access of the terminal device 230, and is responsible for RRC communication with the terminal device 230. The network device 220 may be added during RRC reconfiguration, to provide an additional radio resource.

In addition, in the two network devices shown in FIG. 2, one network device, for example, the network device 210, may be responsible for exchanging a radio resource control message with a terminal device and responsible for interacting with a core network control plane entity. In this case, the network device 210 may be referred to as a master node (MN). For example, the master node may be a MeNB or an MgNB, which is not limited thereto. The other network device, for example, the network device 220, may be referred to as a secondary node (SN). For example, the secondary node may be a SeNB or an SgNB, which is not limited thereto. A plurality of serving cells in the master node may form a master cell group (MCG), including one primary cell (PCell) and one or more optional secondary cells (secondary cell, SCell). A plurality of serving cells in the secondary node may form a secondary cell group (SCG), including one primary SCG cell (primary secondary cell, PSCell) and one or more optional SCells.

Similarly, the terminal device may alternatively have communication connections simultaneously to a plurality of network devices and may receive and send data. In the plurality of network devices, one network device may be responsible for exchanging a radio resource control message with the terminal device and responsible for interacting with the core network control plane entity. In this case, the network device may be referred to as an MN, and other network devices may be referred to as SNs.

Certainly, the network device 220 may alternatively be a master base station or a master node, and the network device 210 may alternatively be a secondary base station or a secondary node. This is not limited in this application. In addition, for ease of understanding, FIG. 1 and FIG. 2 show a case in which two network devices are wirelessly connected to the terminal device. However, this should not constitute any limitation on a scenario to which this application is applicable. The terminal device may further establish a radio link with more network devices.

A plurality of antennas may be configured for each communication device such as the network device 110 or the terminal device 120 in FIG. 1, or the network device 210, the network device 220, or the terminal device 230 in FIG. 2. The plurality of antennas may include at least one transmit antenna configured to send a signal and at least one receive antenna configured to receive a signal. In addition, each communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

The network device may be a base station (for example, an access point), and the base station may be a device that communicates with a wireless terminal over an air interface in an access network by using one or more sectors. The base station device may further coordinate attribute management of the air interface. For example, the base station device may be an evolved base station in long term evolution (LTE) or a base station (gNB) or an access point in NR. This is not limited in this application. It should be noted that, the base station described in the embodiments of the present invention may be a base station device, or may be a relay device, or another network element device that has a base station function.

In the embodiments of this application, the network device provides a service for a cell, and the terminal device communicates with the network device by using a transmission resource (for example, a frequency domain resource or a spectrum resource) used by the cell. The cell may be a cell corresponding to the network device (for example, a base station), and the cell may belong to a macro base station, or may belong to a base station corresponding to a small cell. The small cell herein may include a metro cell, a micro cell, a pico cell, a femto cell, and the like. These small cells have characteristics of small coverage and low transmit power, and are applicable to providing a high-speed data transmission service. In addition, the cell may alternatively be a hypercell.

The terminal device may also be referred to as a terminal, and the terminal may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal such as a mobile phone (also referred to as a "cellular" phone) and a computer having a mobile terminal. For example, the wireless terminal may be a portable, pocket-sized, handheld, computer built-in, or in-vehicle mobile apparatus, or may be a personal communications service (personal communication service, PCS) phone, a cordless phone, a session initiation protocol (SIP) phone, a wireless local loop (WLL) station, a personal digital assistant (PDA), or the like. The wireless terminal may also be referred to as a system, a subscriber unit, a subscriber station, a mobile station, a remote station, a remote terminal, an access terminal, a user agent, user equipment, or a user apparatus (user device or user equipment). The wireless terminal may alternatively be a desktop computer, a portable computer, a network server, a palmtop computer (personal digital assistant, PDA), a mobile phone, a tablet computer, a wireless terminal device, a communication device, an embedded device, or the like. This is not limited herein.

The terminal device or the network device in FIG. 1 or FIG. 2 in the embodiments of this application may be implemented by one device, or may be a function module in the device. This is not specifically limited in the embodiments of this application. It may be understood that the foregoing function may be a network element in a hardware device, a software function running on dedicated hardware, a virtualized function instantiated on a platform (for example, a cloud platform), or a chip system. In the embodiments of this application, the chip system may include a chip, or may include a chip and another discrete component.

Figure 3:
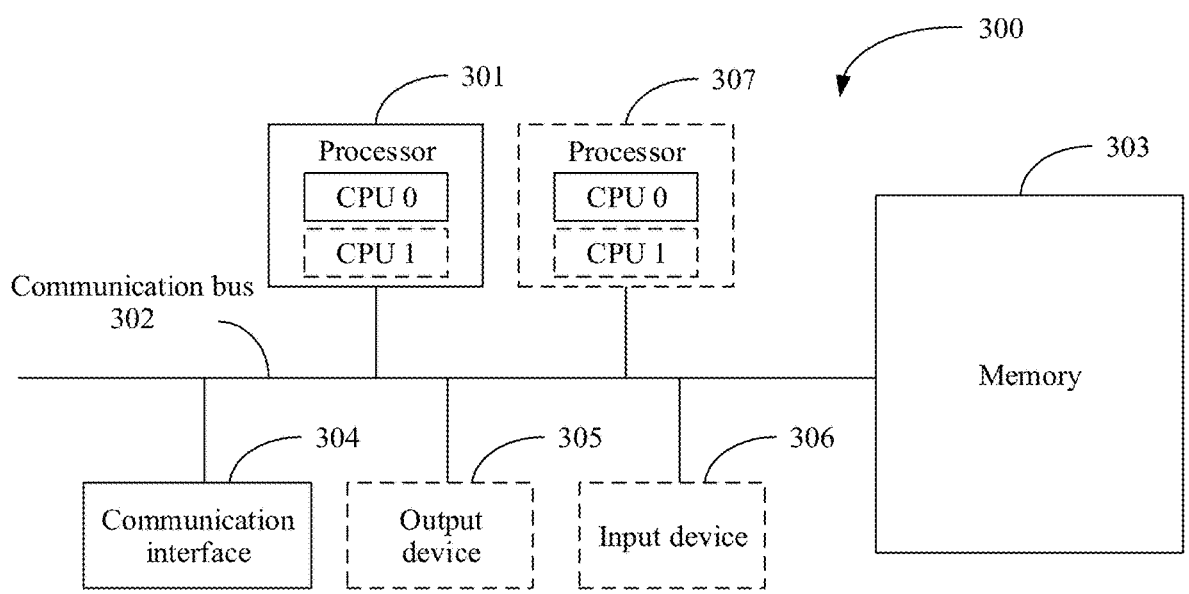
FIG. 3 is a schematic diagram of a structure of a terminal device according to an embodiment of this application.

For example, an apparatus configured to implement functions of the terminal device provided in the embodiments of this application may be implemented by using an apparatus 300 in FIG. 3. FIG. 3 is a schematic diagram of a hardware structure of the apparatus 300 according to an embodiment of this application. The apparatus 300 includes at least one processor 301, configured to implement functions of the terminal device provided in the embodiments of this application. The apparatus 300 may further include a communication bus 302 and at least one communication interface 304. The apparatus 300 may further include a memory 303.

In this embodiment of this application, the processor may be a central processing unit (CPU), a general-purpose processor, a network processor (NP), a digital signal processor (DSP), a microprocessor, a microcontroller, or a programmable logic device (PLD). The processor may alternatively be any other apparatus having a processing function, for example, an application-specific integrated circuit (ASIC), a field programmable gate array (FPGA) or another programmable logic device, a transistor logic device, a hardware component, a software module, or any combination thereof.

The communication bus 302 may be used for transmitting information between the foregoing components.

The communication interface 304 is configured to communicate with another device or a communication network, for example, the Ethernet, a radio access network (RAN), or a wireless local area network (wireless local area networks, WLAN). The communication interface 304 may be an interface, a circuit, a transceiver, or another apparatus that can implement communication. This is not limited in this application. The communication interface 304 may be coupled to the processor 301. The coupling in this embodiment of this application is indirect coupling or a communication connection between apparatuses, units, or modules, may be in an electrical, a mechanical, or another form, and is used for information exchange between the apparatuses, the units, or the modules.

In the embodiments of this application, the memory may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory is not limited thereto. The memory may exist independently; or may be coupled to the processor, for example, through the communication bus 302. The memory may alternatively be integrated with the processor.

The memory 303 is configured to store program instructions, and the processor 301 may control execution of the program instructions, to implement an SSB measurement method provided in the following embodiments of this application. The processor 301 is configured to invoke and execute the instructions stored in the memory 303, to implement the SSB measurement method provided in the following embodiments of this application.

Optionally, the computer-executable instructions in this embodiment of this application may also be referred to as application program code. This is not specifically limited in this embodiment of this application.

Optionally, the memory 303 may be included in the processor 301.

During specific implementation, in an embodiment, the processor 301 may include one or more CPUs, for example, a CPU 0 and a CPU 1 in FIG. 3.

During specific implementation, in an embodiment, the apparatus 300 may include a plurality of processors, for example, the processor 301 and a processor 307 shown in FIG. 3. Each of the processors may be a single-core processor (single-CPU) or a multi-core processor (multi-CPU). The processor herein may be one or more devices, circuits, and/or processing cores configured to process data (for example, computer program instructions).

During specific implementation, in an embodiment, the apparatus 300 may further include an output device 305 and an input device 306. The output device 305 is coupled to the processor 301, and may display information in a plurality of manners. For example, the output device 305 may be a liquid crystal display (LCD), a light emitting diode (LED) display device, a cathode ray tube (CRT) display device, a projector, or the like. The input device 306 is coupled to the processor 301, and may receive input of a user in a plurality of manners. For example, the input device 306 may be a touchscreen device, or a sensor device.

Figure 4:
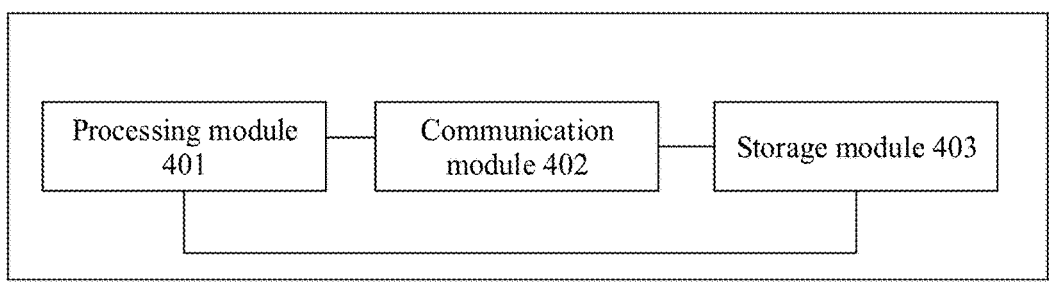
FIG. 4 is a schematic diagram of another structure of a terminal device according to an embodiment of this application.

FIG. 4 is a schematic diagram of another structure of the terminal device. The terminal device may include a processing module 401, a communication module 402, and a storage module 403. The processing module 401 is configured to control each hardware apparatus, application software, and the like of the terminal device. The communication module 402 is configured to receive a message sent by the network device or send a message to the network device, or may send data of the terminal device to another device. The storage module 403 is configured to store a software program of the terminal device, store data, run software, and the like.

To make descriptions of the following embodiments clear and concise, related concepts or technologies are first briefly described.

SSB: The SSB includes a primary synchronization signal (PSS), a secondary synchronization signal (SSS), a physical broadcast channel (PBCH), and a PBCH demodulation reference signal (PBCH-DMRS). The PSS and the SSS are used by a terminal device to perform downlink synchronization, including clock synchronization, frame synchronization, and symbol synchronization; used to obtain a cell identity (ID); used to measure cell signal quality (reference signal received power (RSRP)/reference signal received quality (RSRQ)/signal to interference plus noise ratio (SINR)) mainly by using the SSS; and used for initial beam selection, radio resource management (RRM) measurement, and the like. The PBCH carries a master information block (MIB).

Currently, the terminal device may measure or receive an SSB based on ssb-ToMeasure, and ssb-ToMeasure is indicated by per frequency. When a part of positions of SSBs sent by cells are different, ssb-ToMeasure cannot well reflect a sending status of SSBs of all cells on one frequency. For example, it is assumed that there are two cells on a frequency 1, a bitmap of SSBs sent by a serving cell may be 1101 (that is, a third SSB is not sent), and a bitmap of SSBs sent by a neighboring cell of the serving cell may be 1011 (that is, a second SSB is not sent). In this case, ssb-ToMeasure may be set to 1001, to reduce power consumption of a terminal and to ensure that the terminal can measure all SSBs indicated by ssb-ToMeasure. Consequently, UE misses measuring a second SSB sent by the serving cell, and a measurement result of the serving cell deteriorates.

Embodiments of this application provide an SSB measurement method. A terminal device may measure, in a first measurement window based on first information, an SSB sent by a serving cell, where the first information indicates a time domain position of the SSB sent by the serving cell. This can ensure that the terminal device measures the SSB of the serving cell by using more accurate sending information (the first information) of the SSB of the serving cell, and improve measurement accuracy on the serving cell.

The following describes the technical solutions in the embodiments of this application with reference to the accompanying drawings in the embodiments of this application. In the descriptions of this application, unless otherwise stated, "at least one" means one or more, and "a plurality of" means two or more. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence, and the terms such as "first" and "second" do not indicate a definite difference.

For ease of understanding, the following specifically describes the SSB measurement method provided in the embodiments of this application with reference to the accompanying drawings.

Figure 5:
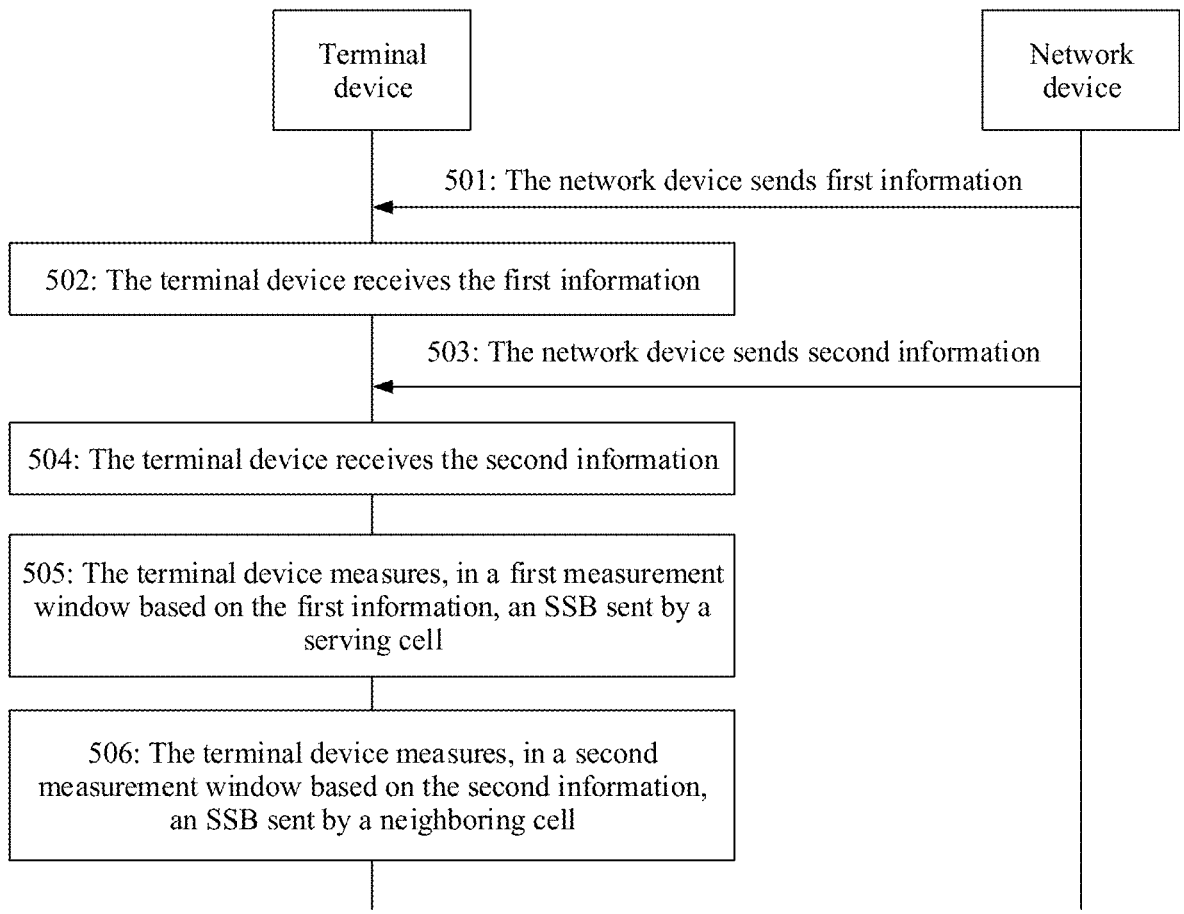
FIG. 5 is a schematic diagram of signal interaction applicable to an SSB measurement method according to an embodiment of this application.

As shown in FIG. 5, an embodiment of this application provides an SSB measurement method, including the following steps.

501: A network device sends first information, where the first information indicates a time domain position of an SSB sent by a serving cell.

For example, the first information may be ssb-PositionsInBurst.

502: A terminal device receives the first information, where the first information indicates the time domain position of the SSB sent by the serving cell.

For a terminal device in a connected state (connected), the serving cell may be a cell that establishes an RRC connection to the terminal device. The terminal device in the connected state may obtain the first information by receiving RRC signaling sent by the serving cell. For example, the first information may be carried in a servingCellConfigCommon field in the RRC signaling.

For a terminal device in an idle state/inactive state (idle/inactive), the serving cell may be a cell on which the terminal device camps. The terminal device in the idle/inactive state may obtain the first information by receiving a broadcast message sent by the camped cell. For example, the first information may be carried in a servingCellConfigCommonSIB field in a SIB 1.

503: The network device sends second information, where the second information indicates a set of SSBs that the terminal device needs to measure and that are sent by a neighboring cell.

For example, the second information may be ssb-ToMeasure.

Optionally, there is no necessary execution sequence between step 501 and step 503 in this embodiment. Step 501 may be performed before step 503. Alternatively, step 501 may be performed before step 503. Alternatively, step 501 and step 503 may be performed simultaneously. This is not specifically limited in this embodiment.

504: The terminal device receives the second information, where the second information indicates the set of SSBs that the terminal device needs to measure and that are sent by the neighboring cell.

The terminal device in the idle/inactive state may obtain the second information by receiving a broadcast message sent by the camped cell. For example, the second information may be carried in a SIB 2 and/or a SIB 4.

The terminal device in the connected state may obtain the second information by receiving RRC signaling sent by the serving cell. For example, the second information may be carried in a MO in the RRC signaling.

Optionally, there is no necessary execution sequence between step 502 and step 504 in this embodiment. Step 502 may be performed before step 504. Alternatively, step 502 may be performed after step 504. Alternatively, step 502 and step 504 may be performed simultaneously. This is not specifically limited in this embodiment.

505: The terminal device measures, in a first measurement window based on the first information, the SSB sent by the serving cell.

The first measurement window is a time window in which the terminal device performs SSB measurement. The terminal device needs to measure, only in the first measurement window, the SSB sent by the serving cell, and does not need to perform SSB measurement outside the first measurement window. This can avoid unnecessary measurement by the terminal device, and reduce power consumption of the terminal device.

The terminal device may obtain a configuration parameter of the first measurement window by receiving the RRC signaling. The configuration parameter of the first measurement window may include a window periodicity, a window offset, and window duration.

For example, the first measurement window may be a synchronization signal/physical broadcast channel block measurement timing configuration (SS/PBCH block measurement timing configuration, SMTC) window. A configuration parameter of the SMTC may be carried in the MO in the RRC signaling, and the configuration parameter of the SMTC window may include an SMTC timing field and an SMTC duration field. The SMTC timing field may indicate an SMTC window periodicity and an SMTC window offset. For example, the SMTC window periodicity may be 5 ms, 10 ms, 20 ms, 40 ms, 80 ms, or 160 ms. The SMTC window offset may range from 0 ms to (SMTC window periodicity −1) ms. For example, the SMTC window offset may range from 0 ms to 4 ms, from 0 ms to 9 ms, from 0 ms to 19 ms, from 0 ms to 39 ms, from 0 ms to 79 ms, or from 0 ms to 159 ms. The SMTC duration field may indicate a length of the SMTC window. For example, the length of the SMTC window may be 1 ms, 2 ms, 3 ms, 4 ms, or 5 ms. It may be understood that a boundary of the SMTC window may be aligned with a subframe boundary of the serving cell.

For intra-frequency measurement in a connected state, the network device may configure at most two SMTC windows on one frequency for the terminal device. The at most two SMTC windows may have a same offset and a same length, but have different periodicities. If the network device configures two SMTC windows on one frequency for the terminal device, the network device may notify, by using configuration information (for example, a list list), the terminal device of an SMTC window applicable to each cell on the frequency. If an SMTC window applicable to a cell is not explicitly indicated, the cell is applicable to an SMTC window with a longer periodicity. For inter-frequency measurement in a connected state and measurement in an idle state, the network device may configure at most one SMTC window on one frequency for the terminal device.

The first information may include a first bitmap, the first bitmap may include one or more bits, and each bit corresponds to one SSB index. The terminal device determines, based on a bit whose value is 1 in the first bitmap, an SSB that needs to be measured in a first SMTC window and that is sent by the serving cell. Specifically, if a value of a bit in the first bitmap is 1, the terminal device measures an SSB indicated by an SSB index corresponding to the bit. If a value of the bit is 0, the terminal device may not measure an SSB indicated by an SSB index corresponding to the bit.

Optionally, the first bitmap may include a plurality of lengths. For example, a length of the first bitmap may be 4, 8, or 64. For example, on a frequency less than 3 GHz, the length of the first bitmap may be 4 because there may be a maximum of 4 SSB positions in an SS burst. On a frequency that ranges from 3 GHz to 6 GHz, the length of the first bitmap may be 8 because there may be a maximum of 8 SSB positions in an SS burst. On a frequency greater than 6 GHz, the length of the first bitmap may be 64 because there may be a maximum of 64 SSB positions in an SS burst.

506: The terminal device measures, in a second measurement window based on the second information, the SSB sent by the neighboring cell.

The neighboring cell is a neighboring cell of the serving cell of the terminal device. The neighboring cell may include an intra-frequency neighboring cell of the serving cell (that is, a neighboring cell that is on a same frequency as the serving cell), and may also include an inter-frequency neighboring cell of the serving cell (namely, a neighboring cell that is on a different frequency from the serving cell). There may be one or more intra-frequency neighboring cells of the serving cell, and there may be one or more inter-frequency neighboring cells of the serving cell.

For inter-frequency measurement in the connected state, the second measurement window may be different from the first measurement window. For example, the network device may configure different SMTC windows on different frequencies for the terminal device. For a configuration parameter of the second measurement window, refer to related descriptions in step 505. Details are not described herein again.

For intra-frequency measurement in the connected state, the second measurement window and the first measurement window may be the same or different. For example, for intra-frequency measurement in the connected state, the network device may configure at most two SMTC windows (for example, SMTC 1 and SMTC 2) on one frequency for the terminal device. The terminal device may measure, in the SMTC 1, SSBs sent by the serving cell and some intra-frequency neighboring cells of the serving cell; and measure, in the SMTC 2, an SSB sent by a remaining intra-frequency neighboring cell of the serving cell. For example, it is assumed that there are three intra-frequency neighboring cells of the serving cell: a neighboring cell 1, a neighboring cell 2, and a neighboring cell 3. The terminal device may measure, in the SMTC 1, SSBs sent by the serving cell and the neighboring cell 1; and measure, in the SMTC 2, SSBs sent by the neighboring cell 2 and the neighboring cell 3. It may be understood that, when an SSB sent by the neighboring cell 1 is measured, the second measurement window is the SMTC 1, and the second measurement window is the same as the first measurement window. When the SSBs sent by the neighboring cell 2 and the neighboring cell 3 are measured, the second measurement window is the SMTC 2, and the second measurement window is different from the first measurement window.

The second information may be indicated by per frequency. To be specific, the second information indicates a set of SSBs of all neighboring cells that need to be measured on one frequency. The terminal device measures, based on second information corresponding to each frequency, the set of SSBs sent by the neighboring cells on the frequency.

The second information may include a second bitmap, the second bitmap may include one or more bits, and each bit corresponds to one SSB index. If a value of a bit in the second bitmap is 1, the terminal device measures an SSB indicated by an SSB index corresponding to the bit. If a value of the bit is 0, the terminal device may not measure an SSB indicated by an SSB index corresponding to the bit. Similar to the first bitmap, the second bitmap may also include a plurality of lengths. For example, a length of the second bitmap may be 4, 8, or 64.

Optionally, when the serving cell does not send the first information, or the terminal device receives no first information, in other words, when step 501 and/or step 502 are not performed, the terminal device may measure, in the first measurement window based on the second information, the SSB sent by the serving cell.

Optionally, there is no necessary execution sequence between step 505 and step 506 in this embodiment. Step 505 may be performed before step 506. Alternatively, step 505 may be performed before step 506. Alternatively, step 505 and step 506 may be performed simultaneously. This is not specifically limited in this embodiment.

According to the method in this embodiment of this application, the terminal device may measure, in the first measurement window based on the first information, the SSB sent by the serving cell, where the first information indicates the time domain position of the SSB sent by the serving cell. This can ensure that the terminal device measures the SSB of the serving cell by using more accurate sending information (the first information) of the SSB of the serving cell, and improve measurement accuracy on the serving cell.

Figure 6:
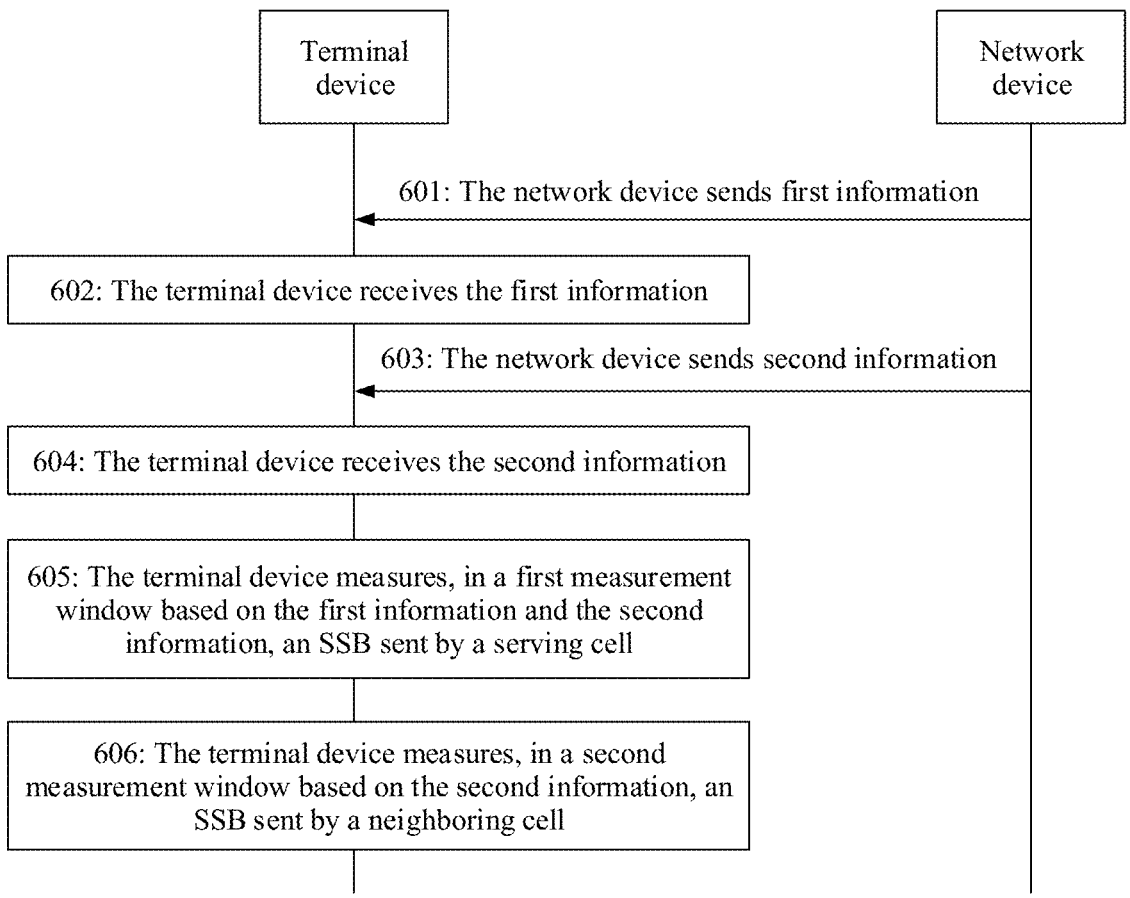
FIG. 6 is another schematic diagram of signal interaction applicable to an SSB measurement method according to an embodiment of this application.

As shown in FIG. 6, an embodiment of this application provides an SSB measurement method, including the following steps.

601: A network device sends first information, where the first information indicates a time domain position of an SSB sent by a serving cell.

Refer to related descriptions in step 501. Details are not described herein again.

602: A terminal device receives the first information, where the first information indicates the time domain position of the SSB sent by the serving cell.

Refer to related descriptions in step 502. Details are not described herein again.

603: The network device sends second information, where the second information indicates a set of SSBs that the terminal device needs to measure.

For example, the second information may be ssb-ToMeasure, indicating the set of SSBs that the terminal device needs to measure. The set of SSBs that the terminal device needs to measure include the SSB sent by the serving cell and an SSB sent by a neighboring cell.

The second information may be carried in RRC signaling or a broadcast message. For related descriptions, refer to step 504. Details are not described herein again.

604: The terminal device receives the second information, where the second information indicates the set of SSBs that the terminal device needs to measure.

Refer to related descriptions in step 504. Details are not described herein again.

605: The terminal device measures, in a first measurement window based on the first information and the second information, the SSB sent by the serving cell.

The terminal device may measure, in the first measurement window based on an intersection of the first information and the second information, the SSB sent by the serving cell. For example, the first information includes a first bitmap, and the second information includes a second bitmap. If a value of an $N^{th}$ bit in the first bitmap and a value of an $N^{th}$ bit in the second bitmap both are 1, the terminal device measures an SSB indicated by an SSB index corresponding to the $N^{th}$ bits. N is an integer greater than or equal to 0.

In a possible design, an SSB index corresponding to each bit in the second bitmap may be the same as an SSB index corresponding to each bit in the first bitmap. For example, it is assumed that the first bitmap includes four bits. A first bit corresponds to an SSB whose index is 0, a second bit corresponds to an SSB whose index is 1, a third bit corresponds to an SSB whose index is 2, and a fourth bit corresponds to an SSB whose index is 3. The second bitmap includes four bits. A first bit also corresponds to an SSB whose index is 0, a second bit corresponds to an SSB whose index is 1, a third bit corresponds to an SSB whose index is 2, and a fourth bit corresponds to an SSB whose index is 3.

Figure 7:
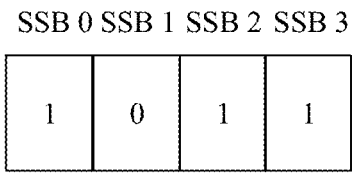
FIG. 7 is a schematic diagram of a first bitmap and a second bitmap according to an embodiment of this application.
Figure 7:
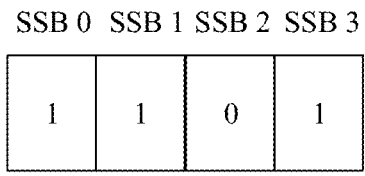

For example, as shown in FIG. 7, the first bitmap may include four bits, corresponding to SSBs whose indexes are 0, 1, 2, and 3; and the second bitmap may include four bits, corresponding to SSBs whose indexes are 0, 1, 2, and 3. If values of all bits in the first bitmap are 1011, and values of all bits in the second bitmap are 1101, the terminal device measures SSBs (that is, SSB 0 and SSB 1) corresponding to SSB indexes corresponding to the first bits and the fourth bits.

Optionally, when the serving cell does not send the second information, or the terminal device receives no second information, in other words, when step 603 and/or step 604 are not performed, the terminal device measures, in the first measurement window based on the first information, the SSB sent by the serving cell.

606: The terminal device measures, in a second measurement window based on the second information, the SSB sent by the neighboring cell.

Refer to related descriptions in step 506. Details are not described herein again.

Optionally, when the serving cell does not send the second information, or the terminal device receives no second information, in other words, when step 603 and/or step 604 are not performed, the terminal device measures, in the second measurement window, all SSBs sent by the neighboring cell.

Optionally, there is no necessary execution sequence between step 605 and step 606 in this embodiment. Step 605 may be performed before step 606. Alternatively, step 605 may be performed before step 606. Alternatively, step 605 and step 606 may be performed simultaneously. This is not specifically limited in this embodiment.

The SSB sent by the serving cell is measured based on the intersection of the first information and the second information. Compared with that the SSB sent by the serving cell is measured based on only the second information, this may avoid redundant measurement that the terminal device needs to perform on the serving cell because a quantity of SSBs indicated by the second information is greater than that of SSBs (that is, SSBs actually sent by the serving cell) indicated by the first information. Therefore, power consumption of the terminal device can be reduced.

Figure 8:
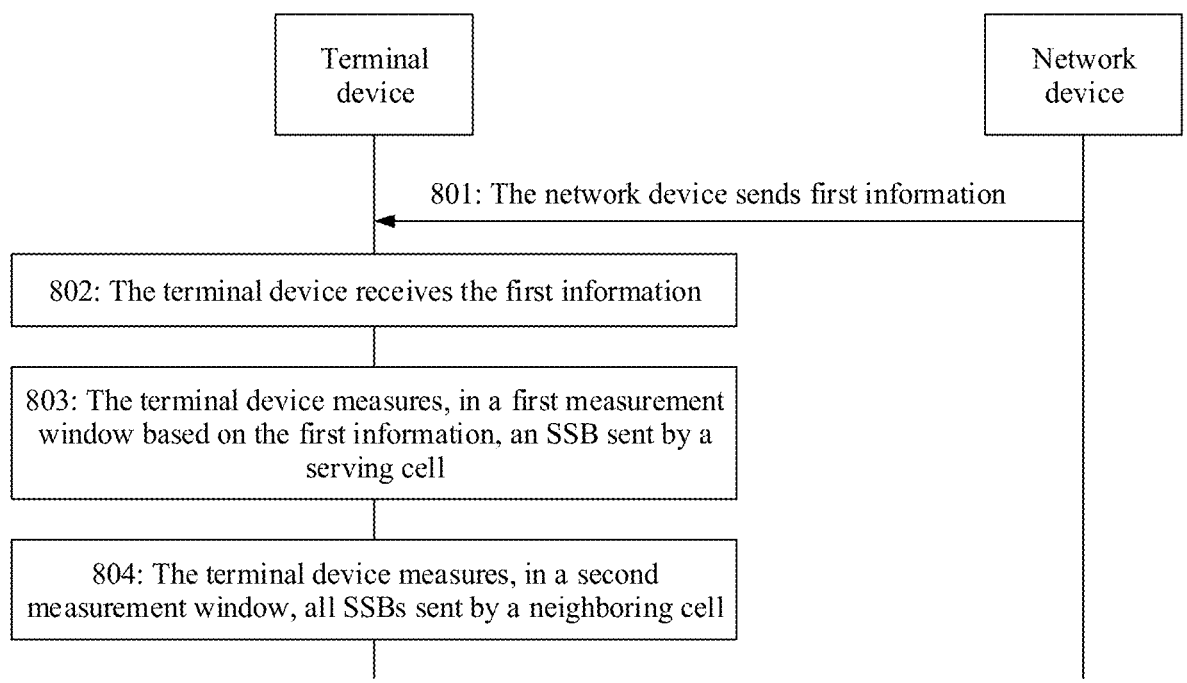
FIG. 8 is still another schematic diagram of signal interaction applicable to an SSB measurement method according to an embodiment of this application.

As shown in FIG. 8, an embodiment of this application provides an SSB measurement method, including the following steps.

801: A network device sends first information, where the first information indicates a time domain position of an SSB sent by a serving cell.

Refer to related descriptions in step 501. Details are not described herein again.

802: A terminal device receives the first information, where the first information indicates the time domain position of the SSB sent by the serving cell.

Refer to related descriptions in step 502. Details are not described herein again.

803: The terminal device measures, in a first measurement window based on the first information, the SSB sent by the serving cell.

Refer to related descriptions in step 505. Details are not described herein again.

Optionally, if the network device does not send the first information, or the terminal device receives no first information, the terminal device measures, in the first measurement window, all SSBs sent by the serving cell.

804: The terminal device measures, in a second measurement window, all SSBs sent by a neighboring cell.

To be specific, if the terminal device receives no indication information (for example, ssb-ToMeasure) used to indicate a set of SSBs that the terminal device needs to measure and that are sent by the neighboring cell, the terminal device measures, in the second measurement window, all SSBs sent by the neighboring cell.

For related descriptions of the second measurement window, refer to step 506. Details are not described herein again.

Optionally, there is no necessary execution sequence between step 803 and step 804 in this embodiment. Step 803 may be performed before step 804. Alternatively, step 803 may be performed before step 804. Alternatively, step 803 and step 804 may be performed simultaneously. This is not specifically limited in this embodiment.

According to the method in this embodiment of this application, if the terminal device receives no indication information (for example, ssb-ToMeasure) used to indicate the set of SSBs that the terminal device needs to measure and that are sent by the neighboring cell, the terminal device may measure, in the first measurement window based on the first information, the SSB sent by the serving cell, where the first information indicates the time domain position of the SSB sent by the serving cell. This can ensure that the terminal device measures the SSB of the serving cell by using more accurate sending information (the first information) of the SSB of the serving cell, and improve measurement accuracy on the serving cell.

In the embodiments provided in this application, the methods provided in the embodiments of this application are described from perspectives of the terminal device, the network device, and interaction between the network device and the terminal device. To implement functions in the foregoing methods provided in the embodiments of this application, the network device and the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 9:
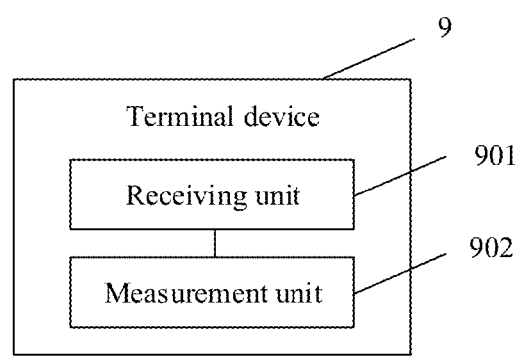
FIG. 9 is a schematic diagram of still another structure of a terminal device according to an embodiment of this application.

When each function module is obtained through division corresponding to each function, FIG. 9 is a schematic diagram of a possible structure of an apparatus 9 in the foregoing embodiments. The apparatus may be a terminal device, and the terminal device includes a receiving unit 901 and a measurement unit 902. In an embodiment of this application, the receiving unit 901 is configured to receive first information, where the first information indicates a time domain position of an SSB sent by a serving cell. The receiving unit 901 may be further configured to receive second information, where the second information indicates a set of SSBs that the terminal device needs to measure and that are sent by a neighboring cell, or the second information indicates a set of SSBs that the terminal device needs to measure. The measurement unit 902 is configured to measure, in a first measurement window based on the first information, the SSB sent by the serving cell; or measure, in the first measurement window based on the first information and the second information, the SSB sent by the serving cell. The measurement unit 902 may be further configured to measure, in a second measurement window based on the second information, the SSB sent by the neighboring cell.

In the method embodiments shown in FIG. 5, FIG. 6, and FIG. 8, the receiving unit 901 is configured to support the terminal device in performing step 502 and step 504 in FIG. 5, step 602 and step 604 in FIG. 6, and step 802 in FIG. 8. The measurement unit 902 is configured to support the terminal device in performing step 505 and step 506 in FIG. 5, step 605 and step 606 in FIG. 6, and step 803 and step 804 in FIG. 8. All related content of the steps in the foregoing method embodiments may be cited in function descriptions of corresponding function modules. Details are not described herein again.

Division into the modules in the embodiments of this application is an example, is merely division into logical functions, and may be other division during actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module. For example, in the embodiments of this application, the receiving unit and the sending unit may be integrated into a transceiver unit.

The methods provided in the embodiments of this application may be all or partially implemented by using software, hardware, firmware, or any combination thereof. When software is used for implementation, the methods may be all or partially implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (solid state drives, SSD)), or the like.

It is clear that a person skilled in the art can make various modifications and variations to the embodiments of this application without departing from the spirit and scope of this application. In this case, this application is intended to cover these modifications and variations to the embodiments of this application provided that they fall within the scope of protection defined by the following claims and their equivalent technologies.

What is claimed is:

1. A synchronization signal/physical broadcast channel block (SSB) measurement method, comprising:
   receiving, by a terminal device, first information, wherein the first information indicates a time domain position of an SSB sent by a serving cell;
   receiving, by the terminal device, second information, wherein the second information indicates a set of SSBs that the terminal device needs to measure and that are sent by a neighboring cell;
   measuring, by the terminal device in a first measurement window based on the first information, the SSB sent by the serving cell, wherein a first SS/PBCH block measurement timing configuration (SMTC) window and a second SMTC window are configured for one frequency, the first SMTC window has same offset and same length as the second SMTC window, the first SMTC window has a longer periodicity than the second SMTC window, and the terminal device selects the first SMTC window for measurement of a cell on the one frequency in response to determining that configuration information does not explicitly indicate an SMTC window applicable to the cell; and
   measuring, by the terminal device in a second measurement window based on the second information, the SSB sent by the neighboring cell.

2. The SSB measurement method according to claim 1, wherein the method further comprises:
   if the terminal device receives no first information, measuring, by the terminal device in the first measurement window based on the second information, the SSB sent by the serving cell.

3. The SSB measurement method according to claim 1, wherein the first information or the second information is carried in radio resource control (RRC) signaling or a broadcast message.

4. The SSB measurement method according to claim 1, wherein the first measurement window and the second measurement window are the same or different.

5. A terminal device, comprising at least one processor; and one or more memories coupled to the at least one processor and storing programming instructions for execution by the at least on processor to cause the terminal device to:
   receive first information, wherein the first information indicates a time domain position of a synchronization signal/physical broadcast channel block (SSB) sent by a serving cell;
   receive second information, wherein the second information indicates a set of SSBs that the terminal device needs to measure and that are sent by a neighboring cell;
   measure, in a first measurement window based on the first information, the SSB sent by the serving cell, wherein a first SS/PBCH block measurement timing configuration (SMTC) window and a second SMTC window are configured for one frequency, the first SMTC window has same offset and same length as the second SMTC window, the first SMTC window has a longer periodicity than the second SMTC window, and the terminal device selects the first SMTC window for measurement of a cell on the one frequency in response to determining that configuration information does not explicitly indicate an SMTC window applicable to the cell; and
   measure, in a second measurement window based on the second information, the SSB sent by the neighboring cell.

6. The terminal device according to claim 5, wherein the programming instructions, when executed by the at least one processor, cause the terminal device to:
   if the terminal device receives no first information, measure, in the first measurement window based on the second information, the SSB sent by the serving cell.

7. The terminal device according to claim 5, wherein the first information or the second information is carried in radio resource control (RRC) signaling or a broadcast message.

8. The terminal device according to claim 5, wherein the first measurement window and the second measurement window are the same or different.

9. A terminal device, comprising at least one processor; and one or more memories coupled to the at least one processor and storing programming instructions for execution by the at least on processor to cause the terminal device to:
   receive first information, wherein the first information indicates a time domain position of a synchronization signal/physical broadcast channel block (SSB) sent by a serving cell;
   receive second information, wherein the second information indicates a set of SSBs that the terminal device needs to measure;
   measure, in a first measurement window based on the first information and the second information, the SSB sent by the serving cell, wherein the first information comprises a first bitmap, the second information comprises a second bitmap, and wherein the programming instructions, when executed by the at least one processor, cause the terminal device to:
      when a value of an $N^{th}$ bit in the first bitmap is 1 and a value of an $N^{th}$ bit in the second bitmap is 0, refrain from measuring an SSB indicated by an SSB index corresponding to the $N^{th}$ bits, wherein N is an integer greater than or equal to 0; and
      when a value of an $M^{th}$ bit in the first bitmap and a value of an $M^{th}$ bit in the second bitmap both are 1, measure an SSB indicated by an SSB index corresponding to the $M^{th}$ bits, wherein M is an integer greater than or equal to 0, and M is different from N; and
   measure, in a second measurement window based on the second information, an SSB sent by a neighboring cell.

10. The terminal device according to claim 9, wherein the programming instructions, when executed by the at least one processor, cause the terminal device to:
    if the terminal device receives no first information, measure, in the first measurement window based on the second information, the SSB sent by the serving cell.

11. The terminal device according to claim 9, wherein the first information or the second information is carried in radio resource control RRC signaling or a broadcast message.

12. The terminal device according to claim 9, wherein the first measurement window and the second measurement window are the same or different.

* * * * *